United States Patent
Nevin et al.

(10) Patent No.: US 11,338,621 B2
(45) Date of Patent: May 24, 2022

(54) DRIVE-OVER TIRE TREAD MEASUREMENT SYSTEM FOR HEAVY-DUTY MULTI-AXLE VEHICLES

(71) Applicant: Hunter Engineering Company, Bridgeton, MO (US)

(72) Inventors: Andrew B. Nevin, Chesterfield, MO (US); Timothy A. Strege, Sunset Hills, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 30 days.

(21) Appl. No.: 16/953,004

(22) Filed: Nov. 19, 2020

(65) Prior Publication Data
US 2021/0155055 A1    May 27, 2021

Related U.S. Application Data

(60) Provisional application No. 62/940,339, filed on Nov. 26, 2019.

(51) Int. Cl.
| | | |
|---|---|---|
| *G01M 17/02* | (2006.01) | |
| *B60C 11/24* | (2006.01) | |
| *G01B 11/22* | (2006.01) | |

(52) U.S. Cl.
CPC .......... *B60C 11/243* (2013.01); *B60C 11/246* (2013.01); *G01B 11/22* (2013.01); *G01M 17/027* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442;
(Continued)

(56) References Cited

U.S. PATENT DOCUMENTS

| | | | |
|---|---|---|---|
| 7,578,180 B2 * | 8/2009 | Lionetti | G01B 7/26 73/146 |
| 7,797,995 B2 | 9/2010 | Schafer | |

(Continued)

FOREIGN PATENT DOCUMENTS

| | | | | |
|---|---|---|---|---|
| EP | 3916345 A1 * | 12/2021 | .......... | B60C 11/246 |
| WO | WO-2017187164 A1 * | 11/2017 | .......... | B60C 11/246 |
| WO | 2019084390 A1 | 5/2019 | | |
| WO | WO-2019232145 A1 * | 12/2019 | | |
| WO | WO-2021168393 A1 * | 8/2021 | | |

*Primary Examiner* — Andre J Allen
(74) *Attorney, Agent, or Firm* — Sandberg Phoenix & von Gontard P.C.

(57) ABSTRACT

A modular drive-over vehicle inspection system for measuring tire tread depth at multiple points on each individual wheel of a moving vehicle passing through an inspection lane, and which is capable of accommodating vehicles having a range of axle configurations, including three or more of any combination of single-wheel axles, super-single wheel axles, and dual-wheel axles.

20 Claims, 12 Drawing Sheets

(58) Field of Classification Search
CPC ............. B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/0455; B60C 23/08; B60C 23/0454; B60C 23/0461; B60C 23/0483; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| | | |
|---|---|---|
| 8,621,919 B2 | 1/2014 | Pingel |
| 9,046,446 B1 | 6/2015 | Carroll et al. |
| 9,476,801 B2 | 10/2016 | Uffenkamp et al. |
| 9,677,973 B1 | 6/2017 | Carroll et al. |
| 9,779,561 B1* | 10/2017 | Dorrance ............. G07C 5/0808 |
| 9,921,133 B2 | 3/2018 | Lee |
| D842,717 S | 3/2019 | Carroll |
| 2010/0139383 A1 | 6/2010 | Haswell et al. |
| 2011/0100108 A1* | 5/2011 | Tracy .................... G01M 17/02 |
| | | 73/146 |
| 2014/0232852 A1 | 8/2014 | Nobis et al. |
| 2015/0090022 A1 | 4/2015 | Uffenkamp et al. |
| 2016/0159165 A1* | 6/2016 | Bianco ............... G06K 7/10356 |
| | | 73/8 |
| 2017/0124784 A1 | 5/2017 | Wittmann et al. |
| 2017/0301103 A1 | 10/2017 | Gonzaga et al. |
| 2018/0299352 A1 | 10/2018 | Rose et al. |
| 2019/0174071 A1* | 6/2019 | Wasner .................. G01B 11/24 |
| 2022/0018734 A1* | 1/2022 | Leroy .................. B60C 11/243 |

* cited by examiner

FIGURE 3
PRIOR ART
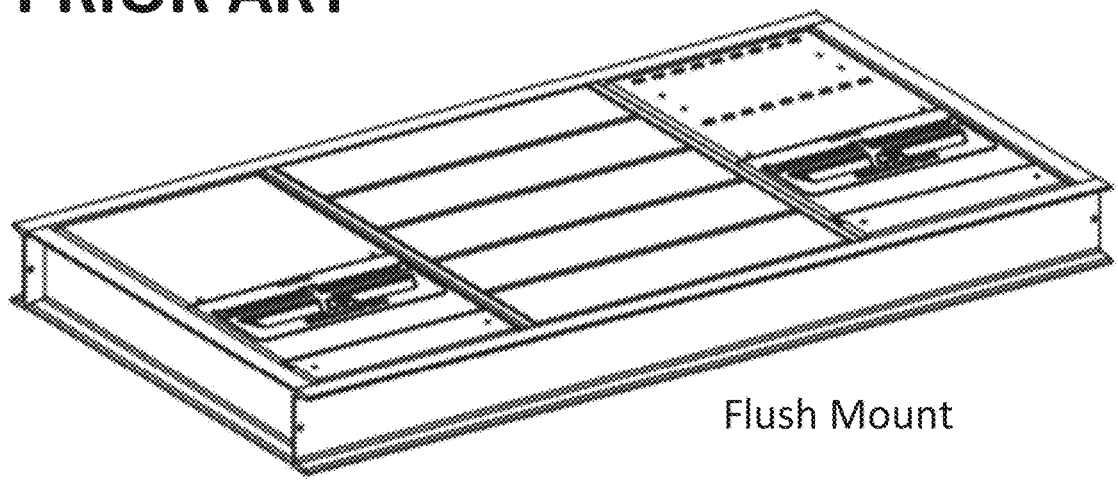
Flush Mount
Surface Mount
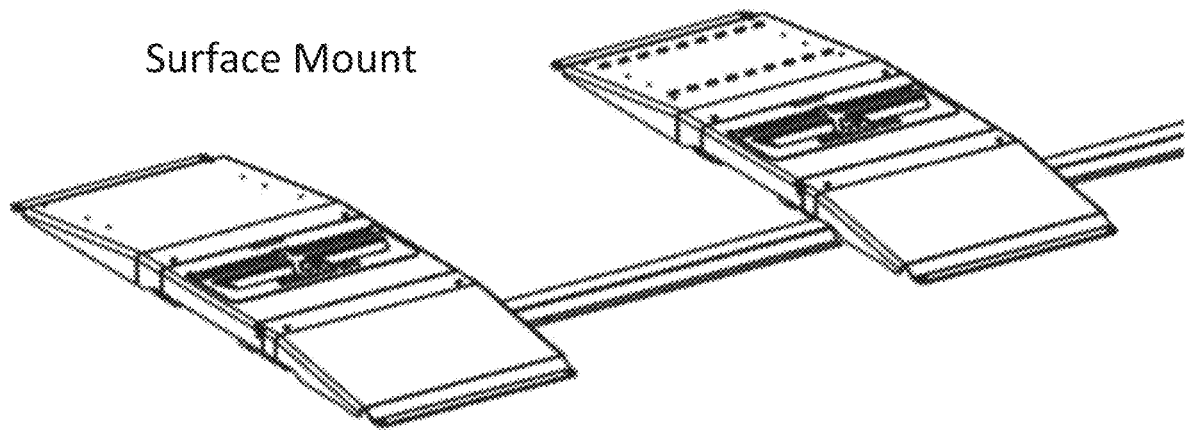
FIGURE 4
PRIOR ART

Figure 5 - Prior Art

DRIVE-OVER TIRE TREAD MEASUREMENT SYSTEM FOR HEAVY-DUTY MULTI-AXLE VEHICLES

CROSS-REFERENCE TO RELATED APPLICATIONS

The present application is related to, and claims priority from, U.S. Provisional Patent Application Ser. No. 62/940,339 filed on Nov. 26, 2019, and which is herein incorporated by reference.

STATEMENT REGARDING FEDERALLY SPONSORED RESEARCH

Not Applicable.

BACKGROUND OF THE INVENTION

The present invention is related to drive-over sensors for measurement of tire tread depth and in particular, to a configuration of multiple tire tread depth measurement sensor units for use with heavy-duty multi-axle vehicles and dual-wheel axles, and to methods for triggering simultaneous data acquisition by, and integrating measurement output from, multiple tire tread depth measurement sensor units.

The use of optical sensors for the acquisition of data associated with motor vehicles is becoming prevalent in the automotive inspection industry. For some applications, such as the acquisition of data associated with vehicle wheels, and in particular, tire tread conditions, specialized optical sensor units are disposed in, or below, a supporting surface over which the vehicle wheels roll, such as a roadway surface, vehicle service bay floor, or vehicle service and inspection support structure. The optical sensor units function to capture data representative of reflected illumination from the tire tread surfaces of the wheels on each side of a passing vehicle. For example, the Quick Tread Edge® drive-over tire tread depth measurement systems manufactured and sold by Hunter Engineering Co. of St. Louis, Mo. consist of two identical sensor units disposed in a laterally spaced arrangement across a vehicle inspection lane, with one unit positioned in the travel path of the vehicle's right side wheels, and the other unit positioned in the travel path of the vehicle's left side wheels. As a vehicle approaches the measurement system, each sensor unit is triggered to project an illuminating line of light onto the tread surface of the approaching tires. Imaging sensors in each sensor unit acquire a sequence of images of the illuminated tread surfaces during the approach to the sensor units, from which multiple tire tread depth measurements for each wheel are determined.

As shown in FIG. 1, each sensor unit is contained within a sealed housing, having one or more panels of optically transparent material such as glass or plastic through which illuminating light is projected, and/or through which reflected light is observed from within an operative field of view. Generally, as seen in FIG. 2, the operative field of view for each sensor unit is limited to a narrow fan angle to ensure that the projected illumination reaches the depths of an approaching tread surface, reducing or eliminating shadow effects on the illuminated tire tread surface. Shadowed regions within deep tire tread grooves may result in tread depth measurement errors.

The laterally spaced sensor units may be configured to trigger from a single trigger source, or to trigger independently from separate trigger sources as the vehicle approaches. Each sensor unit is triggered when the vehicle reaches a selected position within an associated field of view for illumination and observation of an appropriate tread surface or region on an approaching wheel. For sensor units configured to observe either a leading or trailing portion of the tire tread outside of the contact patch region, i.e., those sensor units which have a field of view oriented at an acute angle relative to the surface on which the wheel is rolling, a trigger mechanism is positioned to activate when the approaching wheel is in the proper position for data acquisition, or in a known location relative to the sensor's field of view, such that an appropriate activation delay allows the wheel to roll into the proper position.

Typically, optical sensor units disposed in a drive-through inspection lane are embedded within a supporting floor surface, as shown in FIG. 3, or are secured on top of the supporting floor surface within ramp structures as shown in FIG. 4. With such fixed installations, the narrow fields of view of the optical sensor units are oriented to accommodate vehicles having an expected range of axle widths, traveling in a longitudinal direction, aligned with a midline of the installation. If an approaching vehicle is not centered over the midline, is steered during the approach, or has a track width which varies from the expected vehicle dimensions, some or all of the vehicle wheels may pass outside the sensor unit's fields of view after triggering the sensor activation, resulting in partial readings or missed readings. For example, a sensor system configured with left and right optical sensor units in a drive-over configuration for measuring tire tread depths on vehicles with single-wheel axles may have difficulty acquiring complete tread depth measurement data for each wheel on a wider dual-wheel axle commonly found at the rear of heavy-duty vehicles. The outermost wheels on the dual-wheel axle are commonly spaced apart farther than those of a single-wheel axle, and will pass partially or fully laterally outside of the sensor unit's fields of view when the vehicle is driven over an installation configured to receive passenger vehicles. Similar issues occur with axles supporting oversize wheel assemblies, such as super-single tires, which often have a width equal to, or exceeding, that of a dual-wheel axle.

Conversely, if the sensor system is configured with left and right optical sensor units in a drive-over configuration for measuring tire tread depths wider dual-wheel axles, the spacing of the left and right sensor units may be too wide to acquire measurement data from the single-wheel axle configurations of vehicles passing over the sensor system, particularly if the vehicle is not centered on the installation longitudinal midline as it drives through. Centering misalignment may cause the wheels from one side of the vehicle to pass laterally inside (or outside) of the corresponding sensor unit's field of view, resulting in missed data.

Accordingly, there is a need in the vehicle inspection field for a drive-over tire tread depth measurement system which can accommodate vehicles having a wide range of axle widths, including single-wheel axles, super-single wheel axles, and dual-wheel axles.

BRIEF SUMMARY OF THE INVENTION

Briefly stated, the present invention sets forth a modular drive-over vehicle inspection system for measuring tire tread depth at multiple points on each wheel of a moving vehicle passing through an inspection lane, and which is capable of accommodating vehicles having a wide range of axle widths, including single-wheel axles, super-single wheel axles, and dual-wheel axles.

In one embodiment, the drive-over vehicle inspection system of the present disclosure provides a support structure configured to receive, on each side of longitudinal midline, two or more tire tread depth measurement sensor modules in adjacent positions with aligned fields of view. A common trigger mechanism initiates measurement acquisition in each tire tread depth measurement sensor, such that a processing system receiving data representative of observed tire tread surfaces can combined the data from each measurement sensor module on one side of the inspection system longitudinal midline to capture tire tread depth measurements across a synthesized field of view sufficient to encompass tire tread surfaces associated with wheels on a range of axle widths, including single-wheel axles, super-single wheel axles, and dual-wheel axles.

In a further embodiment, the drive-over vehicle inspection system of the present disclosure utilizes a time-stamp procedure to identify tire tread depth data acquired concurrently from adjacent tire tread depth measurement sensor modules. Tire tread depth data identified as concurrently acquired from adjacent tire tread depth measurement sensors is digitally combined to generate a representation of a merged field of view having an angular width which is greater than the angular width of a field of view associated with the individual tire tread depth measurement sensor modules.

In another embodiment, the drive-over vehicle inspection system of the present disclosure utilizes an image processing procedure to identify common tire tread features or data points in tire tread depth image data acquired from adjacent tire tread depth measurement sensor modules. Image processing aligns identified common tire tread features or data points within overlapping tire tread depth images from the adjacent sensors to digitally generate a combined image representing a merged field of view having an angular width greater than that associated with an individual tire tread depth measurement sensor module.

In a next embodiment, the drive-over vehicle inspection system of the present disclosure includes a processing system configured with software instructions to identify within acquired data, separate tire tread surfaces associated with inner and outer wheel assemblies on each end of a dual-wheel axle. The processing system is further configured with software instructions to individually evaluate the data from each identified tire tread surface to detect tire edge wear for each tire on a dual-wheel axle, and to identify tread wear differences between inner and outer tires on the dual-wheel axle which exceed a threshold.

A method for operating a drive-over vehicle inspection system of the present disclosure with a variety of vehicles having varied axle counts, wherein tire tread depth measurement data acquired from the wheels on a series of axles passing sequentially over a set of tire tread depth measurement sensor modules is collectively associated with a first vehicle until a vehicle reset trigger signal is received. Upon receipt of the vehicle reset trigger signal, either from an external source or from an elapsed time between sequential axles exceeding a threshold, data associated with the first vehicle is stored, transferred, or output, and the drive-over vehicle inspection system is reset to associated data received following the vehicle reset trigger signal with a next vehicle.

In a further method for operating a drive-over vehicle inspection system of the present disclosure, tire tread depth measurement data acquired from the wheels on a series of axles for a single vehicle passing sequentially over a set of tire tread depth measurement sensor modules is evaluated to identify a tread pattern associated with each wheel of the vehicle. The collection of identified tread patterns for the vehicle is evaluated to detect a presence of one or more tires having either a tread pattern or a level of tread wear which differs by more than a tolerance from a majority of the identified tread patterns and levels of tread wear for the vehicle.

In a further variation, a drive-over vehicle inspection system of the present disclosure is configured with one or more infrared thermometers for non-contact tire tread surface temperature measurement from the wheels on a series of axles for vehicles passing over a set of tire tread depth measurement sensor modules. During operation, tire tread temperature measurements acquired from the tread surfaces of the wheels passing over the set of tire tread depth measurement sensor modules are evaluated to identify an average temperature associated with the wheels of the vehicle. The processor of the inspection system is configured with software instructions to evaluate the collection of tire temperatures for the vehicle to detect a presence of one or more tires having a tread temperature which varies from the average temperature by at least a selected threshold.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3 is a perspective illustration of a prior art framework for supporting left wheel and right wheel sensor units of a drive-over tire tread depth optical sensor system in an in-ground installation;

FIG. 4 is a perspective illustration of a prior art ramp system for supporting left wheel and right wheel sensor units of a drive-over tire tread depth optical sensor system in a surface-mount installation;

Corresponding reference numerals indicate corresponding parts throughout the several figures of the drawings. It is to be understood that the drawings are for illustrating the concepts set forth in the present disclosure and are not to scale.

Figure 1:
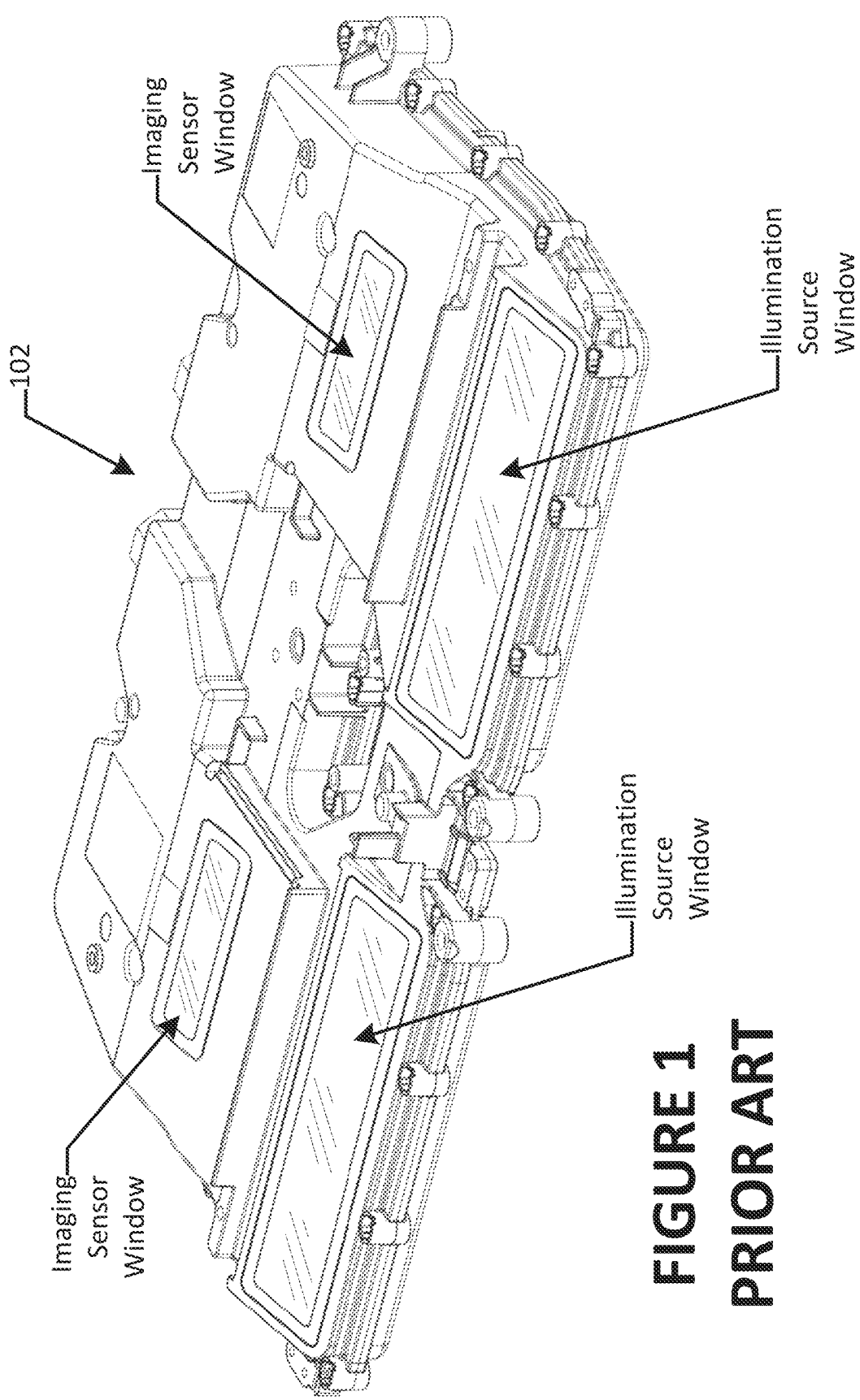
FIG. 1 is a perspective illustration of a prior art single sensor unit for a drive-over tire tread depth optical sensor system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

As used herein, the terms "processor" and "processing system" are used interchangeably, and are intended to refer to any combination of electronic circuits, memories, and program instructions configured to carry out an identified process or procedure. Processors may include local integrated circuits within a tire tread depth optical sensor module. Alternatively, processors and processing systems may be remote from the individual tire tread depth optical sensor modules, and linked thereto via communications network. Any combination of local and remote processors or processing systems may be employed without departing from the scope of the present disclosure, including on-demand cloud-based processing systems.

Figure 2:
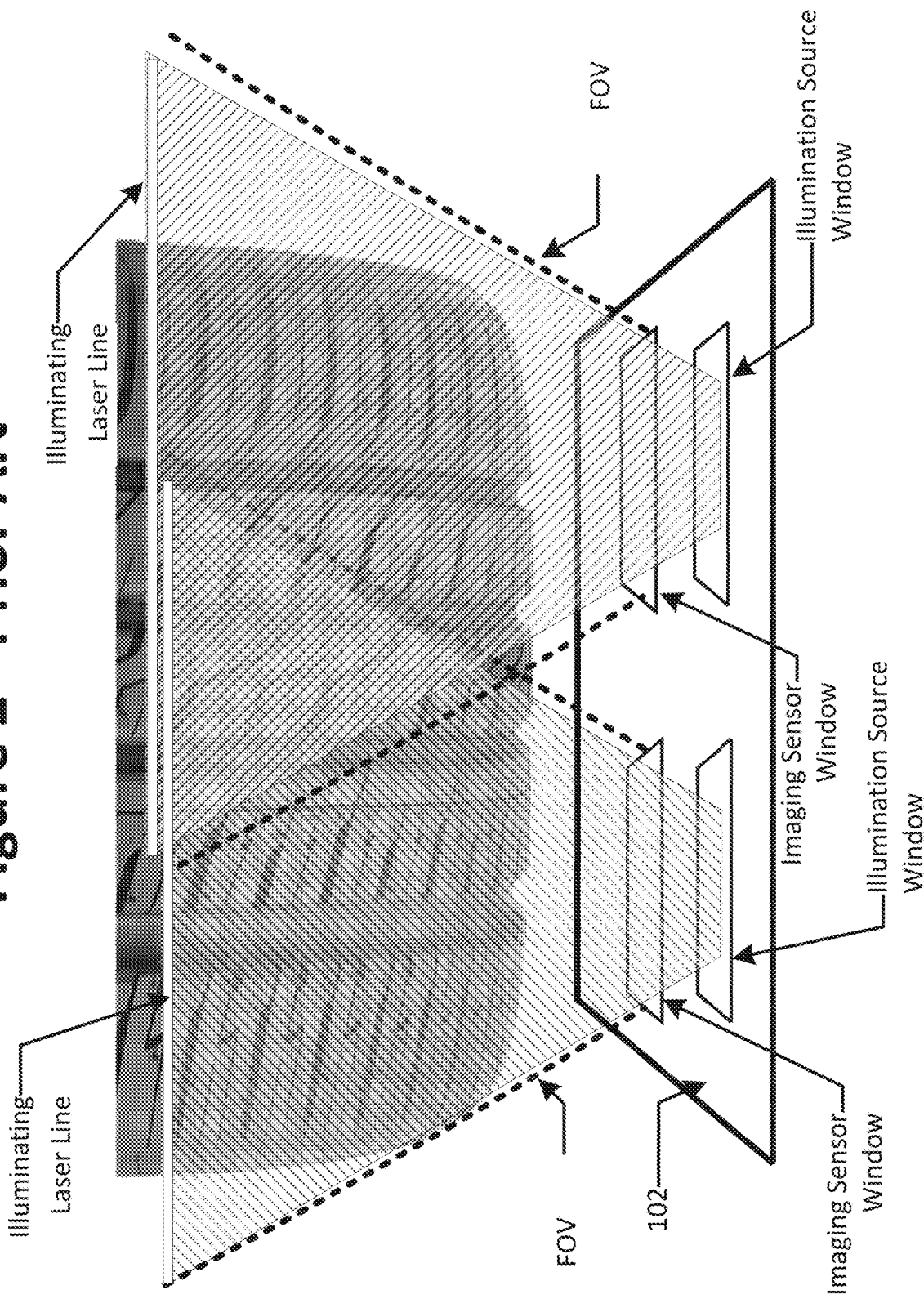
FIG. 2 is a perspective view of the fields of view associated with a prior art sensor module having a pair of illumination sources and a pair of imaging sensors for acquiring tread depth measurement data from an approaching tire tread surface.
Figure 5:
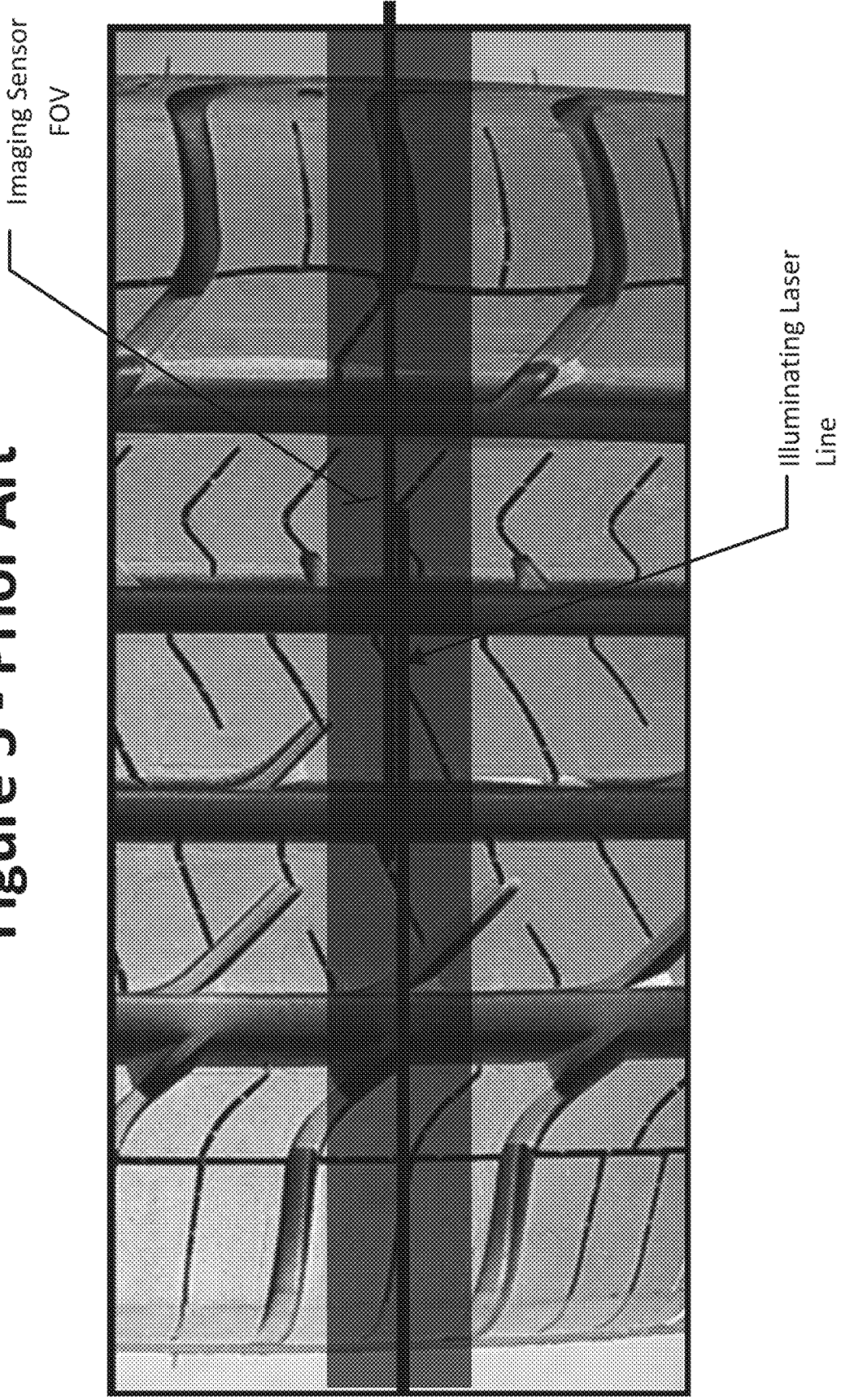
FIG. 5 is a representation of linear segments of tire tread surface illuminated and observed by the prior art sensor module of FIG. 1.
Figure 6:
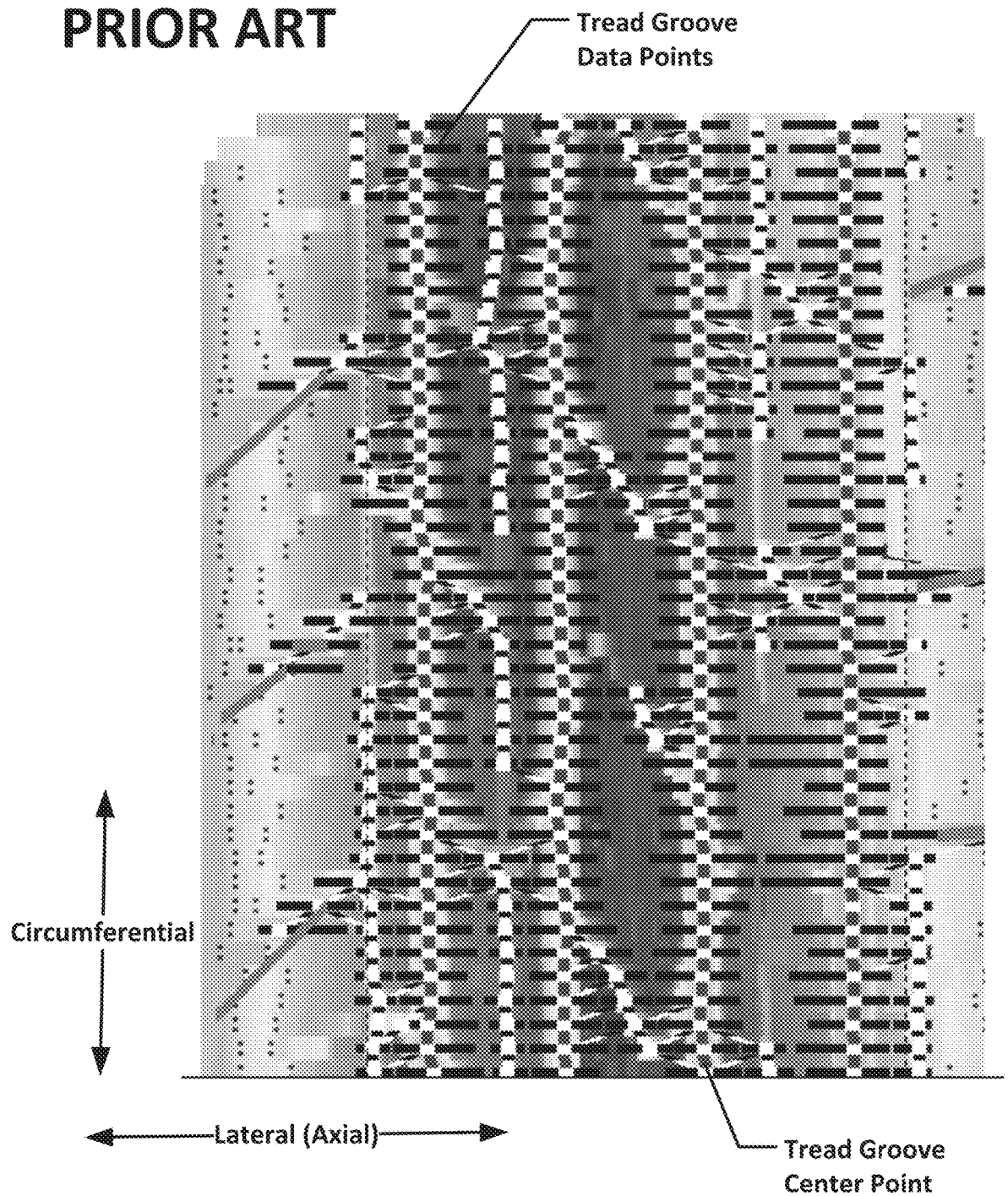
FIG. 6 is a prior art image of a tire tread surface generated from multiple linear segments of tread depth measurement data by the prior art sensor module of FIG. 1 as a wheel assembly passes over the sensor module.

Turning to figures, a prior art tire tread depth optical sensor module is shown generally at FIG. 1. The single sensor module is configured with at least one illumination source and at least one imaging sensor, together with associated control circuits contained within a sealed environmental protection enclosure. As seen in FIG. 2, a sensor module configured with a pair of illumination sources and a pair of imaging sensors illuminates, and acquires measurement data from, a tire tread surface on a wheel of a vehicle approaching and/or passing over sensor module. In response to an appropriate trigger signal, the illumination sources are activated to project planar fans of light, illuminating lines transversely across the tread surface of the approaching wheel, as seen in FIG. 5. Concurrently, the imaging sensors acquire a series of images of an associated field of view as the wheel moves towards the sensor module and through the projected planar fans of light. Within each image, the projected planar fan of light illuminates different linear segments of illuminated surfaces, including the tread, from which depth measurements can be determined by a suitably programmed processing system associated with the sensor module. The processing system is further configured with software instructions to render a representation of the illuminated surfaces, in the form of a point cloud of measurement data, from the sequentially illuminated linear segments and determined depth measurements, as shown in FIG. 6. Subsequent processing of the point cloud of measurement data, either by a suitably programmed control unit or by a remote system, identifies the specific depth measurements associated with an illuminated tire tread surface, and generates appropriate output, such as a tire tread wear report, image, or numerical readings.

For conventional operation in a passenger vehicle inspection lane, one sensor module is positioned within an appropriate support structure on each side of a longitudinal midline of the inspection lane, as shown in FIGS. 3 and 4. One sensor module is generally in-line with the travel path for the wheels on the driver side of the vehicle, with the second sensor module laterally spaced apart, generally in-line with the travel path for the wheels on the passenger side of the vehicle. As seen in FIG. 3, a supporting structure adapted for an in-ground or flush mount installation can be provided, wherein each sensor module is located below a protective vehicle support surface having openings aligned with the illumination sources and imaging sensors. The supporting structure is recessed into the vehicle inspection lane surface, such that the vehicle support surfaces are flush with the ground, providing a uniform surface over which passing vehicles may be driven. Alternatively, as seen in FIG. 4, each sensor module may be disposed within an elevated ramp structure adapted for surface mount installation directly on a floor surface. Approaching vehicles drive onto and over the elevated ramp structures, with each sensor module located below the vehicle support surface, aligned with the openings for the illumination sources and imaging sensors.

In either configuration, the sensor modules may be mounted directly on the underlying support structures, or may be mounted in a configuration which is biased against an underside surface of the vehicle support surfaces to maintain a predetermined position and orientation relative to the vehicle support surface, which may undergo deflection under load from a passing vehicle. Suitable trigger mechanisms for activating the sensor modules may be incorporated into the vehicle support surface, ramps, or adjacent inspection lane floor or roadway surfaces. The entire vehicle support surface, or at least a portion thereof, may be configured to be opened or removed, allowing access to the underlying sensor modules for manual cleaning, repair, or replacement as necessary from time to time.

As noted above, drive-over vehicle inspection systems configured for use with passenger vehicles and light trucks are not well suited for use with heavy-duty vehicles having three or more axles and a range of wheel assembly widths and configurations, including single-wheel axles, dual-wheel axles, and super-single wheel axles. Accordingly, the present disclosure sets forth a variety of drive-over vehicle inspection systems which are specifically adapted for use with heavy-duty vehicles.

Figure 7:
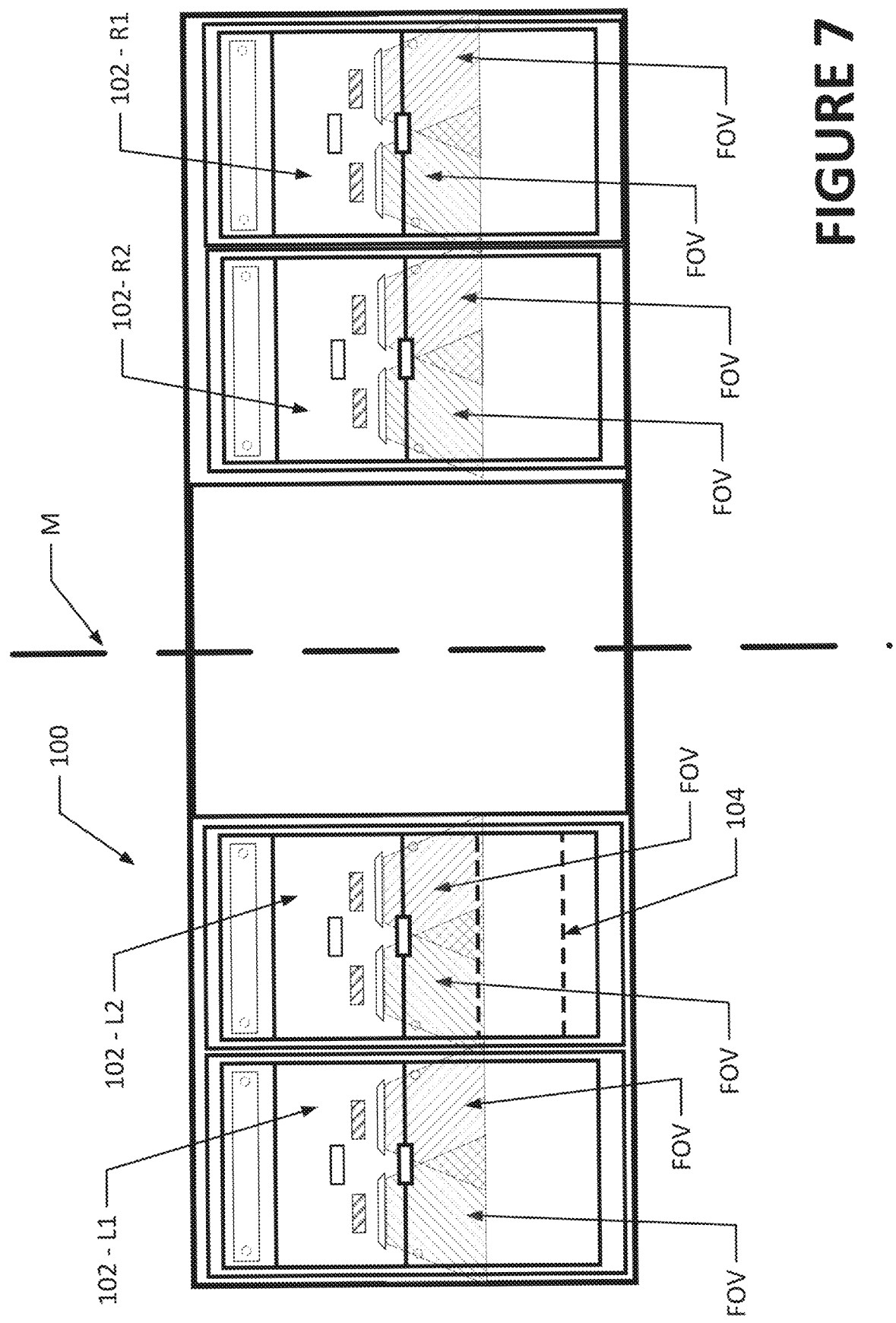
FIG. 7 is a top view of a heavy-duty drive-over vehicle inspection system of the present disclosure, incorporating a pair of tire tread depth sensor modules on each side of an inspection lane longitudinal midline.

In one embodiment, the drive-over vehicle inspection system 100 of the present disclosure provides a support structure configured to receive, on each side of an inspection lane longitudinal midline M, two or more separate tire tread depth measurement sensor modules 102 as shown in FIG. 7.

The separate sensor modules 102, designated as L1, L2 and R1, R2 are secured in adjacent positions on the respective left and right sides of the inspection lane longitudinal midline, with generally aligned fields of view (FOV) oriented to observe the wheel assemblies W on the corresponding sides of a passing heavy-duty vehicle HDV. A common mechanical trigger mechanism 104 is provided to initiate measurement acquisition in each tire tread depth measurement sensor 102. As seen in FIG. 7, the common mechanical trigger mechanism 104 is located such that a wheel assembly W on the left side of a heavy-duty vehicle HDV approaching the inspection system will contact the mechanical trigger mechanism 104 prior to passing over the sensor modules 102. It will be readily understood by those of ordinary skill in the art that the placement of the trigger mechanism 104 is constrained by the configuration of the sensor modules 102, and that in different configurations, separate trigger mechanisms 104 may be used for the left side sensor modules 102 (L1, L2) together, right side sensor modules 102 (R1, R2) together, or for each sensor module 102 individually.

In an alternate embodiment, the common trigger mechanism is optical instead of mechanical, consisting of one or more imaging systems having associated fields of view directed into the inspection lane and towards an approaching vehicle. With appropriate hardware and software configuration, the imaging systems detect motion within the observed field of view, indicating the presence of a vehicle moving towards the sensor units, and generates an appropriate trigger signal for conveyance to the sensor units.

Upon receipt of an appropriate trigger signal, each sensor module 102 (L1, L2, R1, and R2) is configured to illuminate and observe tire tread surfaces within associated fields of view FOV as the heavy-duty vehicle HDV approaches and passes over the inspection system 100. For configurations in which multiple illumination sources and imaging sensors having adjacent fields of view are located within each individual sensor module 102, such as seen in FIGS. 2 and 7, a sensor module calibration procedure is used prior to operation to ensure that the adjacent imaging sensors (not shown) within an individual sensor module 102 are observing and acquiring data from linear segments of illuminated surfaces (tire tread surfaces) which are in lateral alignment with each other. The resulting output from an individual sensor module 102, regardless of the number of illumination sources and imaging sensors contained therein, is a point cloud of aligned depth measurements. The aligned depth measurements extend across linear segments of illuminated tire tread within a circumferentially extending region of a tire tread surface passing through the combined fields of view FOV associated with the sensor module 102. As shown in FIG. 6, the aligned depth measurements can be illustrated with various color or gray-scale gradients corresponding to the measured depths. When two or more separate sensor modules 102 (such as L1 and L2 or R1 and, R2), each containing one or more illumination sources and imaging sensors are disposed in adjacent positions, as shown in FIG. 7, each sensor module 102 generates an independent point cloud output representative of tire tread depth measurements acquired within an associated fields of view.

Figure 8:
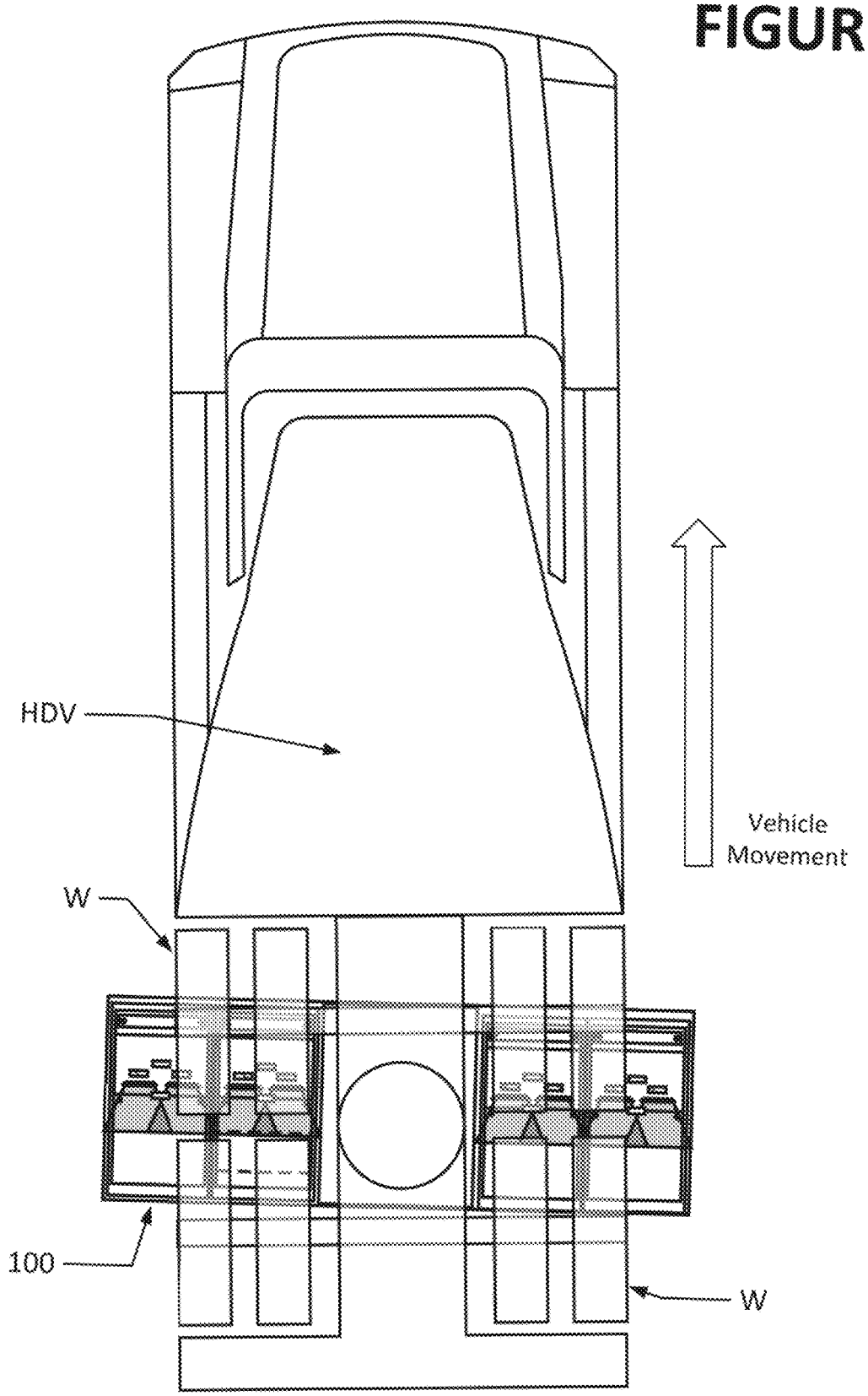
FIG. 8 is a top view of a heavy-duty vehicle with including dual-wheel axles passing over the heavy-duty drive-over vehicle inspection system of FIG. 7.
Figure 9:
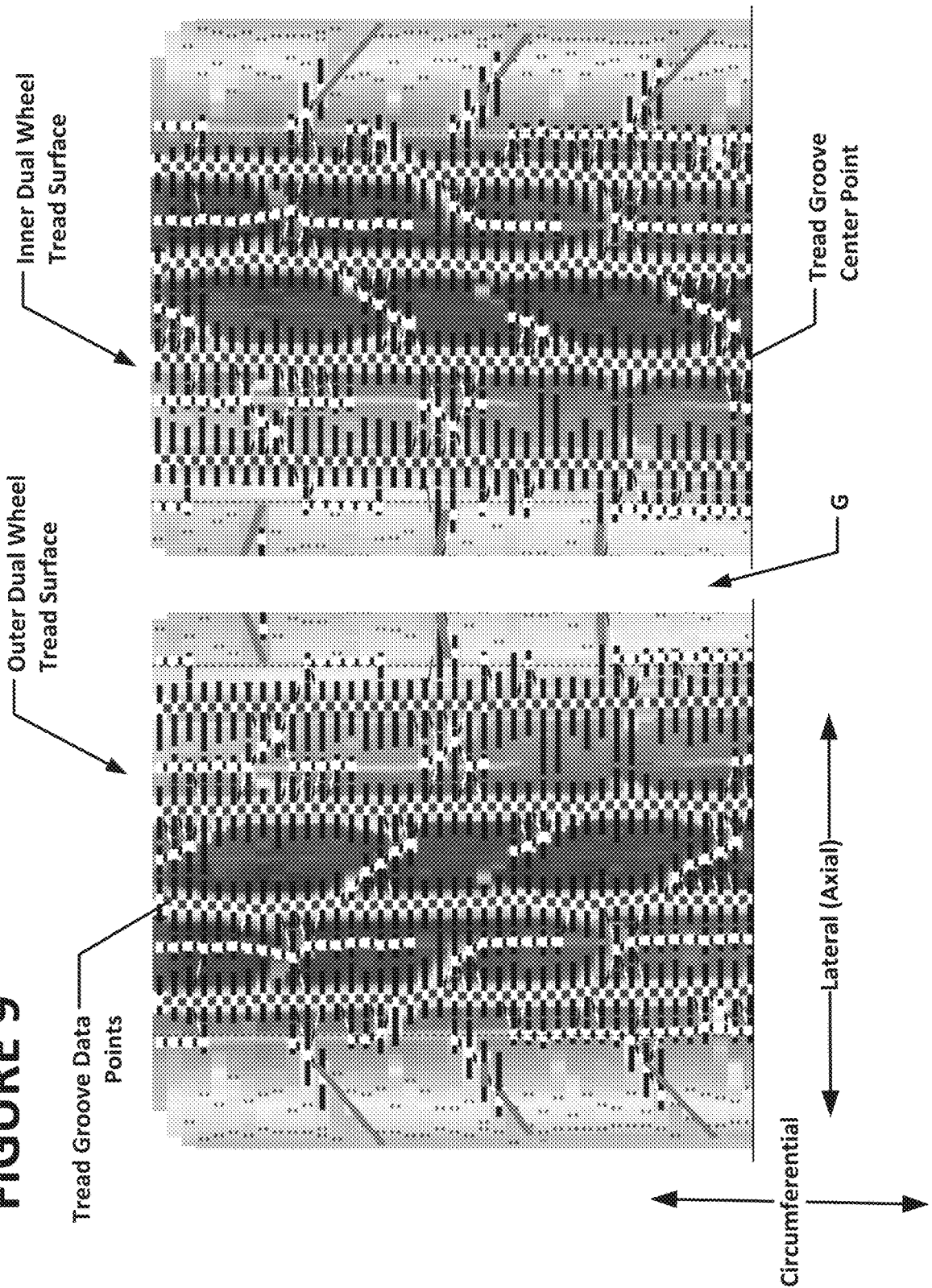
FIG. 9 is a composite image of tire tread surfaces on one end of a dual-wheel axle, generated from multiple linear segments of tread depth measurement data acquired by adjacent sensor modules on one side of the inspection system shown in FIGS. 7 and 8.
Figure 10:
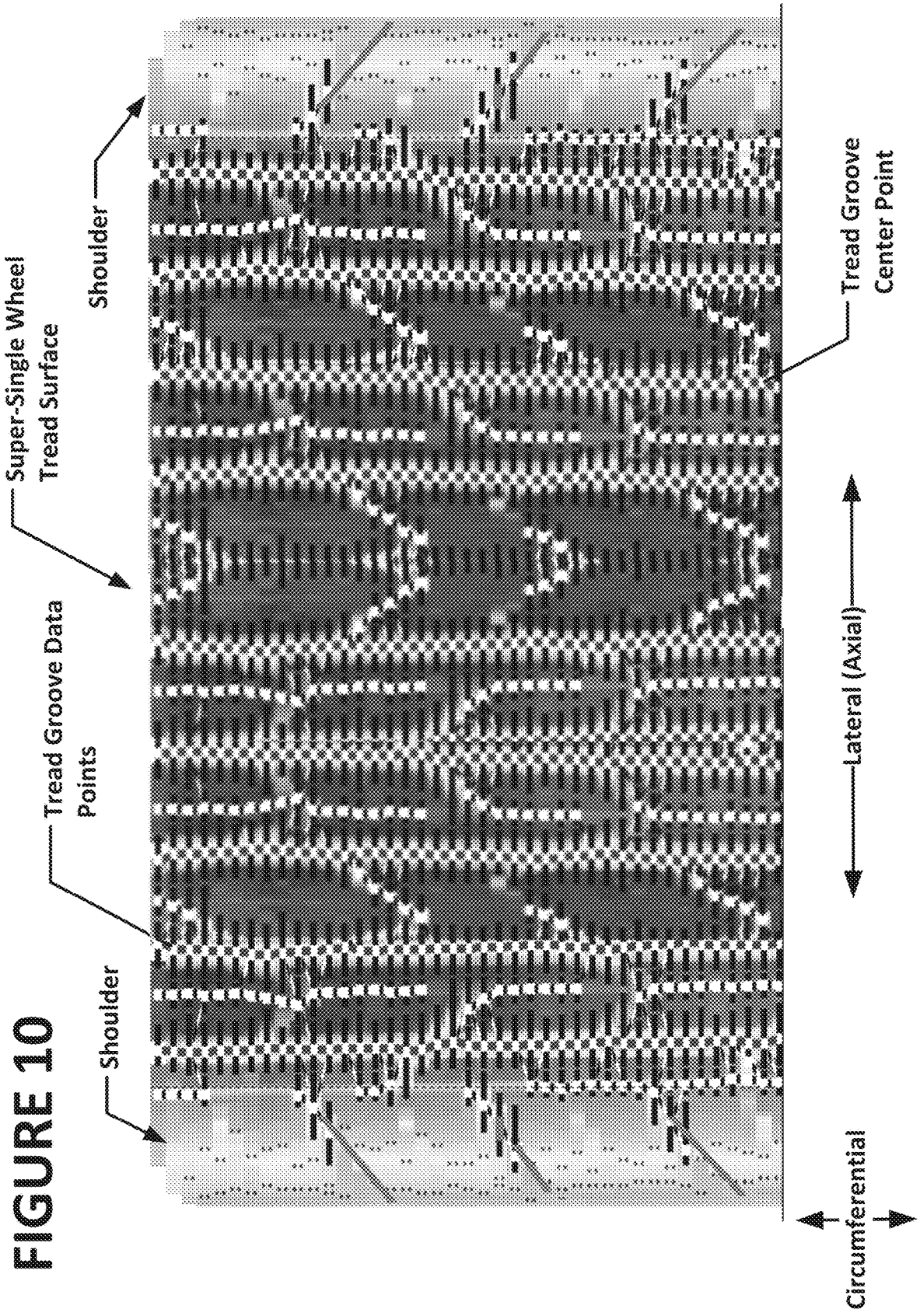
FIG. 10 is a composite image of a super-single tire tread surfaces on one end of an axle, generated from multiple linear segments of tread depth measurement data acquired by adjacent sensor modules on one side of the inspection system shown in FIG. 7.

Acquisition of tread depth measurement data from each separate sensor module 102 in response to a common trigger signal alone does not guarantee that each sensor module 102 will acquire depth measurement data simultaneously or in synchronization, due to signal travel time, circuitry differences, and physical misalignment between adjacent sensor modules 102. To synthesize a complete point-cloud representation of the tread surfaces of the tires on the heavy-duty vehicle HDV passing over adjacent sensor modules 102, the resulting point-cloud output from each individual sensor module 102 is evaluated to identify and align the linear segments of tire tread falling within a region of the tire tread surface observed by each adjacent sensor module 102 within a region of overlapping fields of view. Identified and aligned segments from two or more sensor modules 102 enable synthesis of a combined field of view sufficient to capture tire tread surface data across a variety of wheel configurations. For example, when a heavy-duty vehicle HDV having multiple axles and dual-wheel assemblies W passes over the inspection system 100, as seen in FIGS. 8 and 9, the tire tread surfaces for each dual-wheel assembly W are fully captured. Similarly, for heavy-duty vehicles HDV having axles supported on super-single wheel assemblies having a width approximately the same as that of dual-wheel assemblies W, the combined fields of view FOV capture the full width of the tread surface, as shown in FIG. 10.

In one embodiment, linear segments of tread depth measurements which are independently acquired by adjacent sensor modules 102 are identified within the point cloud of depth measurement data and aligned by a processing system using a synchronized timestamp. Each linear segment of tread depth measurements present within the point cloud data received from the adjacent sensor modules 102 includes a timestamp from a synchronized clock or timer circuit. Linear segments of depth measurement data points from adjacent sensor modules 102 having timestamp values which are within an acceptable tolerance of each other are considered to have been acquired from the same extended linear slice of tire tread surface, and therefore represent the lateral extent of a combined field of view formed by the adjacent sensor modules 102. For each pair of linear segments of depth measurement data points representing an extended linear slice, duplicate depth measurements occurring within a common portion of the extended linear slice observed by both sensor modules 102 are identified for resolution by the processing system. The duplicate depth measurement data points may be resolved by averaging the values from each sensor module 102, discarding a portion of the depth measurement data points from one sensor module 102, or by any other suitable data combination algorithm. The remaining depth measurement data points representing the extended linear slice correspond to tread depth measurements acquired across a synthesized field of view sufficient to encompass tire tread surfaces associated with a range of heavy-duty vehicle wheel assemblies W, including single-wheels, super-single wheels, and adjacent tires in dual-wheel assemblies.

In another embodiment, a drive-over vehicle inspection system 100 of the present disclosure includes a processing system configured to utilize image processing techniques to identify common tire tread features or data points in representations of tire tread surfaces present within the overlapping fields of view observed by adjacent sensor modules. These tire tread features or data points may include, but are not limited to, a pattern of tire tread grooves, tire tread surface edges, or regions of uniform tread depth. Tire tread features or data points identified in tire tread surface representations generated from tread depth measurements acquired by adjacent sensor modules 102 are further evaluated by the processing system to identify features or data points having strong congruency. The processing system utilizes identified congruent features or data points to align the tire tread surface representations from adjacent sensor modules 102, and to generate a composite representation of the tire tread surfaces observed by the adjacent sensor modules 102, such as the dual-wheel configuration shown in FIG. 9 or the super-single wheel configuration shown in FIG. 10. The composite representation contains tread depth measurement data acquired from a merged field of view having an angular width greater than the angular width of the individual fields of view FOV associated with the adjacent sensor modules 102. Generating composite representations by aligning congruent tire tread features found in tread surface representations from adjacent sensor modules 102 is particularly suitable for use when the observed wheel assemblies W have tread surfaces containing pronounced circumferential grooves or channels which can be easily identified and aligned in tread surface representations.

Figure 11:
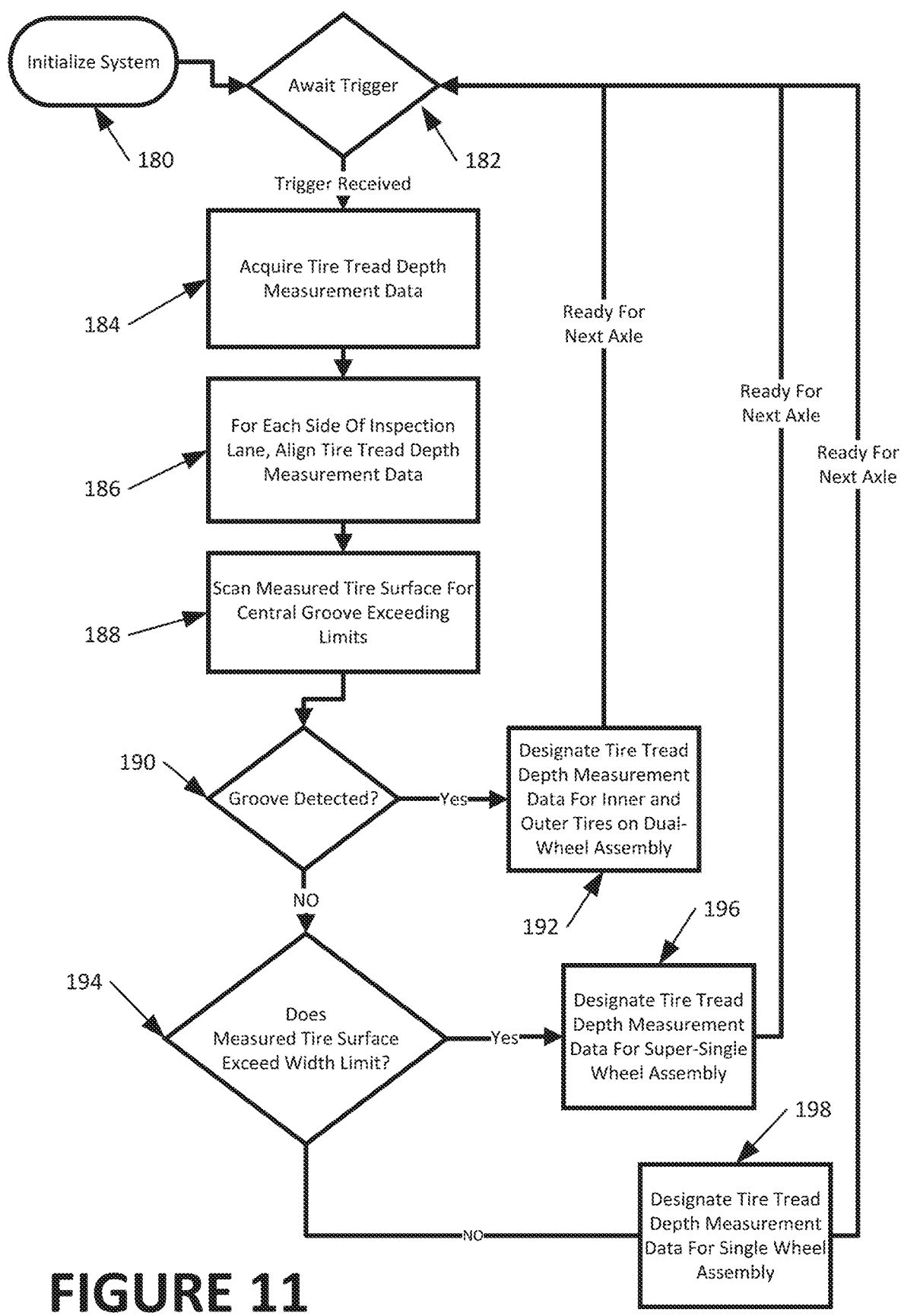
FIG. 11 is a flow chart illustrating a process of the present disclosure for associating tread depth measurement data combined from adjacent sensor modules with specific types of wheel assemblies.

Synthesizing a wide-angle field of view from the merged output of adjacent sensor modules 102 facilitates evaluation of tire tread surfaces commonly found on heavy-duty vehicles, including the individual tire tread surfaces of adjacent wheels W mounted to one end of a dual-wheel axle and the extended tread width of super-single wheel assemblies. In a further embodiment illustrated in FIG. 11, upon initialization (Box 180), the processing system of the drive-over vehicle inspection system 100 is configured with software instructions to await a trigger signal (Box 182) before acquiring tire tread depth measurement data from sensor modules on each side of the inspection lane (Box 184). Measurement data from adjacent sensor modules and the right side of the inspection lane is aligned to generate a synthesized wide field of view, as is the measurement data from adjacent sensor modules on the left side of the inspection lane (Box 186). Tire tread surface measurement data within each synthesized wide field of view is evaluated (Box 188) by the processing system to identify separate tire tread surfaces associated with the inner and outer wheel assemblies on an end of a dual-wheel axle by locating a central tread groove or gap defining a tire separation gap g between the inner and outer tires of each dual wheel assemblies. The tire separation gap G is identified as a linear tire tread groove having a width exceeding a limit, or a depth which is either indeterminable or significantly greater than the depth of other identified tire tread grooves. Upon identification of the tire separation gap G, (Box 192) the processing system associates laterally adjacent tread measurement data with either an inner tire or an outer tire of the dual wheel assembly, depending upon which side of the longitudinal midline M of the inspection lane the wheel assemblies W are located. At this point, the system is ready for measurement data from the next axle, and awaits the appropriate trigger signal (Box 182). In the event a tire separation gap G is not identified, the processing system is configured to check for the presence of a super-single tire having a tire tread surface width which exceeds a limit for a conventional individual tire. (Box 194). Upon identification of a tire tread surface exceeding the established width limit (Box 196), the processing system designates the tire tread depth measurement data as associated with a super-single wheel assembly, such as shown in FIG. 10. The system is then ready for measurement data from the next axle, and awaits the appropriate trigger signal (Box 182). In the even that neither a dual-wheel assembly or a super-single wheel assembly are identified from the acquired tire tread depth measurement data, the processing system associates the acquired data with a conventional single tire wheel assembly (Box 198). The system is then ready for measurement data from the next axle, and awaits the appropriate trigger signal (Box 182).

Identifying inner and outer dual-wheel tread surfaces, super-single tread surfaces, and single tire tread surfaces, enables the processing system to apply tread surface analysis to the individually identified tires, identifying discrete tread grooves, tread depths, and tread edge wear for each tire. For example, with suitable programming instructions, the processing system compares the results from the individual tires in each dual-wheel configuration to identify tread wear or tread pattern differences between the inner and outer tires which may necessitate further inspection.

In addition to having a variety of different wheel configurations, heavy-duty vehicles HDV can have significant variation in the number of axles. Whereas light-duty vehicles universally have two axles, heavy-duty vehicles HDV are commonly configured with three or more axles. When operating a drive-over vehicle inspection system 100 of the present disclosure in an environment wherein different vehicles may pass over the sensors in succession, there is a need to provide a procedure for associating the tire tread depth measurement data from individual axles with designated vehicles. In one embodiment of the present disclosure, tire tread depth measurement data acquired from the wheels on a series of axles passing sequentially over a set of tire tread depth measurement sensor modules 102 is collectively associated with a first vehicle by the processing system in response to a vehicle presence trigger or detection signal. Upon receipt of a vehicle presence trigger or detection signal, acquired depth measurement data is associated with a unique vehicle (such as a timestamp or license plate). The data is stored, transferred, or output in connection with the vehicle, until the drive-over vehicle inspection system is reset by an absence of the vehicle presence trigger or detection signal.

Figure 12:
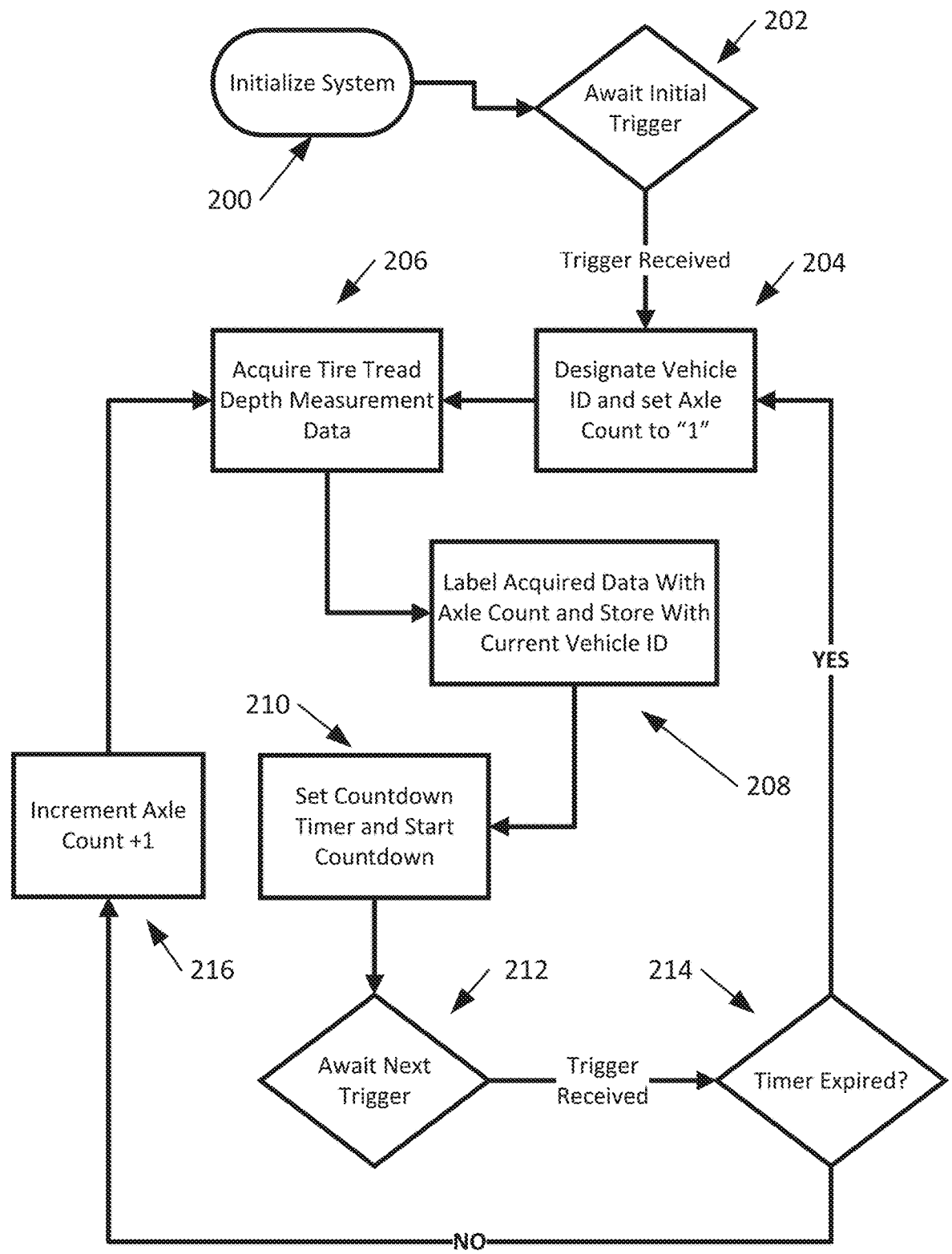
FIG. 12 is a flow chart illustrating a process of the present disclosure for associating tread depth measurements acquired from wheels on sequential axles with an individual vehicle.

The vehicle presence trigger or detection signal may be generated by an external source, such as from a mechanical trigger, an optical trigger having a detection axis which is continuously interrupted by the presence of a vehicle, an optical sensor shadowed by the presence of a vehicle, by a countdown timer following an initial acquisition of data from a first axle on a heavy-duty vehicle HDV, or manually by an operator input. A method of the present disclosure for utilizing a countdown timer is shown in FIG. 12. Utilizing the method of FIG. 12, acquired depth measurement data is associated with a unique vehicle designation or ID until an elapsed time between data acquisition from sequential axles exceeds a threshold, at which point the vehicle designation is reset. To start, the system is initialized (Box 200), and awaits a first trigger signal (Box 202) indicating a heavy-duty vehicle HDV has entered the system. Once the first trigger signal is received, the process designates a current Vehicle ID, and sets the Axle Count to one. (Box 204). As the axle passes over the system, tire tread depth measurement data is acquired. (Box 206). The acquired data is stored in association with the current Axle Count value and the current Vehicle ID. (Box 208). After acquiring data from the current axle, a countdown timer is set to a predetermined value, and a countdown started (Box 210), during which the system awaits the next trigger signal (Box 212) indicating a next axle is approaching the system. Upon receipt of the next trigger signal, the countdown is checked to determine if the countdown timer has expired. (Box 214). An expiration of the countdown timer is indicative of the spacing between subsequent vehicles, causing the system to designate a new Vehicle ID and reset the Axle Count to one. (Box 204). If the countdown timer has not yet expired, the Axle count is incremented by one (Box 216), and the procedure continues with acquisition of tire tread depth measurement data (Box 206).

Those of ordinary skill in the art will recognize that other suitable means for distinguishing between sequential vehicles may be employed without departing from the scope of the present disclosure. A vehicle presence trigger signal may be configured to indicate either the first axle of new vehicle passing over the drive-over vehicle inspection system, or the last axle of the vehicle. Once all of the axles for a heavy-duty vehicle HDV have passed over the inspection system, the resulting tire tread depth measurement data for each axle is packaged or stored by the processing system in a manner which enables the data for an individual vehicle to be identified, processed, recalled, reviewed, etc.

Figure 13:
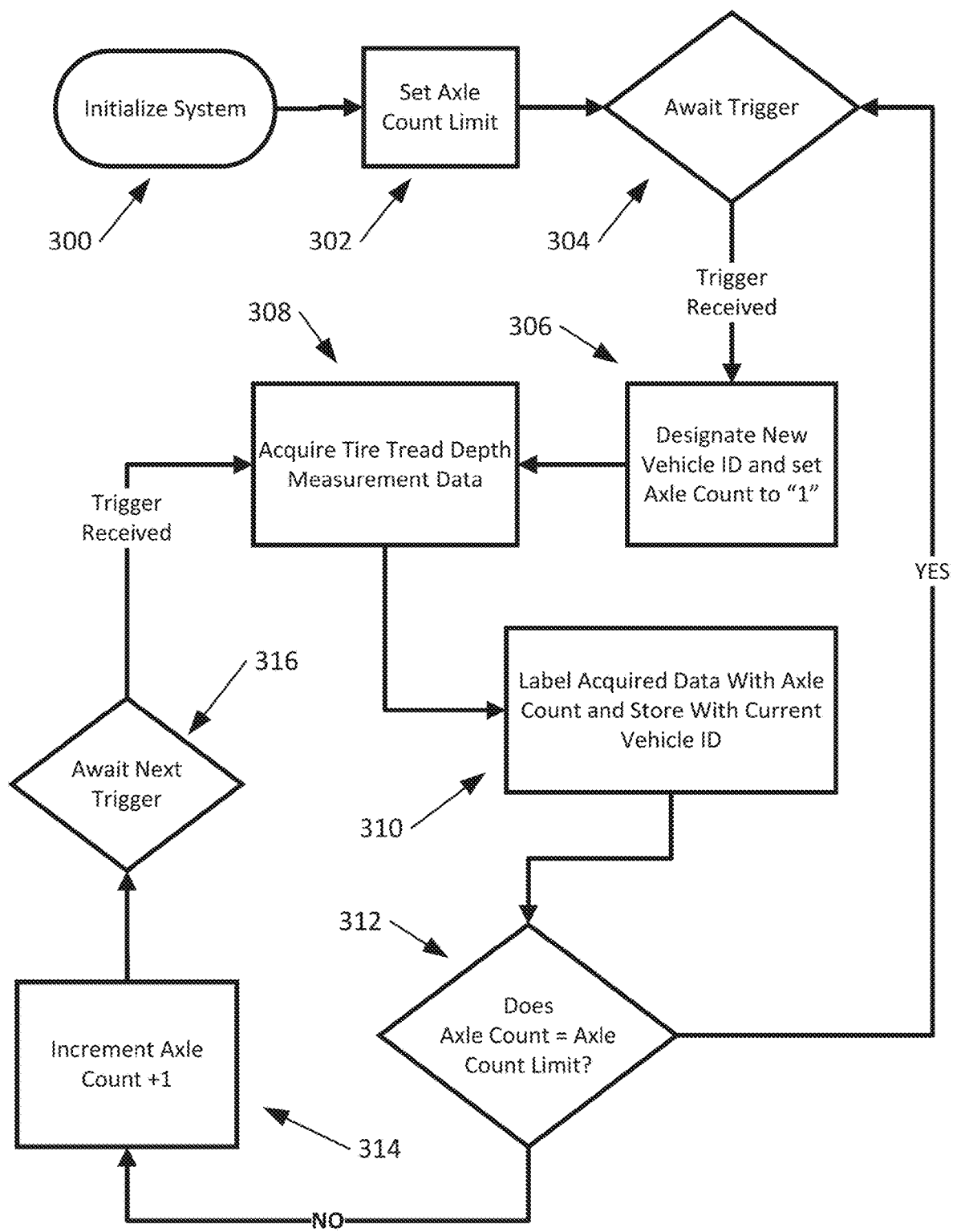
FIG. 13 is a flow chart illustrating an alternate process of the present disclosure for associating tread depth measurements acquired from wheels on sequential axles with an individual vehicle.

Alternatively, as shown in FIG. 13, a method of the present disclosure enables an operator may manually select a default number of axles for association with individual vehicles, causing the system to automatically reset for the next vehicle after acquiring measurement data from the selected number of axles. To start, the system is initialized (Box 300) and an Axle Count Limit is set. (Box 302), after which the system awaits a first trigger signal (Box 304) indicating a heavy-duty vehicle HDV has entered the system. Once the first trigger signal is received, the process designates a current Vehicle ID, and sets the Axle Count to one. (Box 306). As the axle passes over the system, tire tread depth measurement data is acquired. (Box 308). The acquired data is stored in association with the current Axle Count value and the current Vehicle ID. (Box 310). After acquiring data from the current axle, the current Axle Count is compared to the Axle Count Limit. If the values are equal, the process for the current heavy duty vehicle HDV is complete, and the system awaits the next trigger signal (Box 304) to repeat the process for a subsequent heavy-duty vehicle. If the current Axle Count is less than the Axle Count Limit, the Axle Count is incremented (Box 314). The system waits for the next trigger signal (Box 316) after which tire tread depth measurement data for the next axle on the heavy duty vehicle HDV is acquired (Box 308). The process of incrementing the current Axle Count, acquiring data, and comparing with the Axle Count Limit is then repeated until the Axle Count Limit is reached and the system reset for the next vehicle.

When a default number of axles is utilized, the processing system is further configured to provide an operator with a suitable interface for reviewing and revising the stored data to alter the Axle Count Limit for a selected vehicle, so as to accommodate vehicles passing over the system 100 which have a fewer or a greater number of axles, or which are towing a trailer. If an operator alters an Axle Count Limit for the stored records associated with a selected vehicle, the processing system is further configured to automatically re-associate any remaining stored axle data to maintain the default Axle Count Limit for each subsequent vehicle, shifting acquired tire tread depth measurement data between vehicle records as required to accommodate the operator's action.

In a further method for operating a drive-over vehicle inspection system of the present disclosure, tire tread depth measurement data acquired from the wheels on a series of axles for a single vehicle passing sequentially over a set of tire tread depth measurement sensor modules is evaluated to identify a tire tread pattern associated with observed wheels of the vehicle. For example, the system may be configured to detect the presence of circumferential equalizer ribs located within tire tread grooves to assist in equalizing pressure on the shoulders of the tire, stone ejectors or rejecter platforms designed to prevent stones from becoming lodged within the tire ribs, or tie bar linking tread elements together to resist irregular wear-causing tread element motion. In addition, the processing system is optionally configured with program instructions to evaluate the collection of identified tread patterns to detect one or more tires having either a tread pattern or a level of tread wear which differs by more than a tolerance from a majority of identified or acceptable tread patterns for the vehicle, indicative of a need for further inspection of the vehicle.

In a further variation, a drive-over vehicle inspection system of the present disclosure is configured with one or more infrared thermometers or pyrometers for non-contact tire tread surface temperature measurement. During operation, one or more tire tread temperature measurements acquired from the tread surfaces of observed wheels passing over the set of tire tread depth measurement sensor modules. The resulting temperature measurements are evaluated by the processing system to identify a temperature related characteristics of the tires or the vehicle. A temperature of a tire tread surface can be influenced by the tire inflation pressure, the wheel alignment, the tire tread condition, or the vehicle brake conditions. In one embodiment, the processor of the inspection system is configured with software instructions to evaluate tire temperature data acquired from a vehicle to detect a presence of Wone or more tires having a tread surface temperature which exceeds a threshold as an indication of a need for further vehicle inspection. If sufficient tire temperature data is acquired from individual tires on a vehicle, a thermal image of the tire surfaces may be evaluated by the processing system to identify tire tread surfaces exhibiting known thermal patterns indicative of wheel misalignment.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A drive-over tire tread depth measurement system, comprising:
    a first set of drive-over tire tread depth measurement sensor modules disposed on a first lateral side of a vehicle inspection lane, said sensor modules within said first set responsive to a first trigger signal to generate depth measurement data representative of surfaces within a first associated field of view;
    a second set of drive-over tire tread depth measurement sensor modules disposed on a second lateral side of said vehicle inspection lane, said sensor modules within said second set responsive to a second trigger signal to generate depth measurement data representative of surfaces within a second associated field of view;

a processing system operatively coupled to receive said depth measurement data from said sensor modules in said first and second sets, said processing system configured with software instructions to combine said depth measurement data received from said sensor modules in said first set into a first combined representation of an extended field of view synthesized from fields of view associated with said sensor modules in said first set; and combine said depth measurement data received from said sensor modules in said second set into a second combined representation of an extended field of view synthesized from fields of view associated with said sensor modules in said second set.

2. The drive-over tire tread depth measurement system of claim 1 wherein said processing system is further configured to generate a representation of at least one tire tread surface from said depth measurement data contained within said first combined representation;

wherein said processing system is further configured to generate a representation of at least one tire tread surface from said depth measurement data contained within said second combined representation; and wherein said generated representations are illustrative of tire tread surface features for wheels on opposite ends of a common axle.

3. The drive-over tire tread depth measurement system of claim 1 wherein said first trigger signal and said second trigger signal are initiated from a common trigger mechanism.

4. The drive-over tire tread depth measurement system of claim 1 wherein said first trigger signal and said second trigger signal are initiated from separate trigger mechanisms.

5. The drive-over tread depth measurement system of claim 1 wherein said associated fields of view for said sensor modules within said first set are in linear alignment relative to each other; and wherein said associated fields of view for said sensor modules within said second set are in linear alignment relative to each other.

6. The drive-over tread depth measurement system of claim 1 wherein said associated fields of view for adjacent sensor modules within said first set partially overlap at an operative range for acquisition of said tire tread depth measurement data from wheel assemblies at one end of an axle on a vehicle passing through said vehicle inspection lane; and wherein said associated fields of view for adjacent sensor modules within said second set partially overlap at an operative range for acquisition of said tire tread depth measurement data from wheel assemblies at an opposite end of said axle on said passing vehicle.

7. The drive-over tread depth measurement system of claim 6 wherein said processing system is configured to combine said depth measurement data from at least two adjacent sensor modules in a set of sensors by identifying common depth measurement data contained within said overlapping associated fields of view.

8. The drive-over tire tread depth measurement system of claim 6 wherein said processing system is configured to compensate said depth measurement data from at least two adjacent sensor modules in a set of sensors for relative displacement there between by aligning common depth measurement data contained within said overlapping associated fields of view.

9. The drive-over tire tread depth measurement system of claim 1 wherein said processing system is responsive to a vehicle presence trigger signal to associate, with a single heavy-duty vehicle, said combined depth measurement data acquired from wheel assemblies on two or more axles sequentially passing over the first and second sets of sensors.

10. The drive-over tire tread depth measurement system of claim 9 wherein said vehicle presence trigger signal is generated by a motion detection system having a field of view within said inspection lane.

11. The drive-over tire tread depth measurement system of claim 10 wherein said motion detection system is an optical imaging system.

12. The drive-over tire tread depth measurement system of claim 1 wherein said processing system is configured to evaluate at least one of said combined representations of said extended fields of view to distinguish tread surface regions associated with at least one of a super-single tire or adjacent tires on a dual-wheel assembly of an axle.

13. The drive-over tire tread depth measurement system of claim 12 wherein said processing system is configured to distinguish said tread surface regions associated with adjacent tires within said dual-wheel assembly by identifying a tire separation gap between said tread surface regions.

14. A drive-over tire tread depth measurement system for heavy-duty vehicles having at least one axle with dual-wheel assemblies at opposite ends, comprising:

a first set of drive-over tire tread depth measurement sensor modules disposed on a first lateral side of a vehicle inspection lane, said sensor modules within said first set responsive to a first trigger signal to generate tread depth measurement data representative of tire surfaces within an associated field of view;

a second set of drive-over tire tread depth measurement sensor modules disposed on a second lateral side of said vehicle inspection lane, said sensor modules within said second set responsive to a second trigger signal to generate tread depth measurement data representative of tire surfaces within an associated field of view;

a processing system operatively coupled to receive tread depth measurement data from said sensor modules in said first and second sets, said processing system configured with software instructions to evaluate said received tread depth measurement data to distinguish tread depth measurement data associated with individual tires in said dual-wheel assemblies at opposite ends of said at least one dual-wheel assembly axle of said heavy-duty vehicle.

15. The drive-over tire tread depth measurement system of claim 14 wherein said processing system is configured to evaluate said tire tread depth measurement data associated with said individual tires in said dual-wheel assemblies to detect a difference in tread wear exceeding a threshold; and wherein said processing system is configured to provide an output indicating an occurrence of a detected difference.

16. The drive-over tire tread depth measurement system of claim 14 wherein said processing system is configured to evaluate said tire tread depth measurement data associated with said individual tires in said dual-wheel assemblies to identify discrete tread patterns associated with individual tires;

wherein said processing system is configured to provide an output representative of said identified discrete tread patterns.

17. The drive-over tire tread depth measurement system of claim 16 wherein said identified discrete tread patterns include an identification of a presence of one or more tire tread features including circumferential equalizer ribs, stone ejectors, rejecter platforms, or tread element tie bars.

18. A method for drive-over tire tread depth measurement of a heavy-duty vehicle having at least one steer axle and at least one axle with dual-wheel assemblies at opposite ends, comprising:

generating at least one trigger signal responsive to an approach of said at least one steer axle of said heavy-duty vehicle to at least one tire tread depth measurement sensor module disposed on each lateral side of a vehicle inspection lane;

responsive to said at least one trigger signal, acquiring from a left-side drive-over tire tread depth measurement sensor module disposed on a left lateral side of a vehicle inspection lane, tread depth measurement data representative of tire surfaces within a left side field of view for association with said at least one steer axle;

responsive to said at least one trigger signal, acquiring from a right-side drive-over tire tread depth measurement sensor module disposed on a right lateral side of a vehicle inspection lane, tread depth measurement data representative of tire surfaces within a right side field of view for association with said at least one steer axle;

repeating said steps of generating said at least one trigger signal, and acquiring said left-side tread depth measurement data and right-side tread depth measurement data for said at least one dual-wheel assembly axle of said heavy-duty vehicle as said heavy-duty vehicle passes through said vehicle inspection lane;

processing said acquired left-side tread depth measurement data and said right-side tread depth measurement data associated with said at least one steer axle to identify tire tread depth measurements associated with individual tires on opposite ends of said at least one steer axle; and processing said acquired left-side tread depth measurement data and said right-side tread depth measurement data for said at least one dual-wheel assembly axle to identify tire tread depth measurements associated with individual tires in said dual-wheel assemblies on opposite ends of said at least one dual-wheel assembly axle.

19. The method of claim 18 wherein said steps of generating said at least one trigger signal, and acquiring said left-side tread depth measurement data and right-side tread depth measurement data, are repeated for at least one additional axle of said heavy-duty vehicle.

20. The method of claim 19 wherein said steps of processing said acquired left-side tread depth measurement data and said right-side tread depth measurement data are repeated for said at least one additional axle of said heavy-duty vehicle to identify tire tread depth measurements associated with one or more individual tires on opposite ends of said additional axle.

* * * * *